(12) United States Patent
He et al.

(10) Patent No.: US 11,675,568 B2
(45) Date of Patent: Jun. 13, 2023

(54) DUAL VECTOR ARITHMETIC LOGIC UNIT

(71) Applicant: ADVANCED MICRO DEVICES, INC., Santa Clara, CA (US)

(72) Inventors: Bin He, Orlando, FL (US); Brian Emberling, Santa Clara, CA (US); Mark Leather, Santa Clara, CA (US); Michael Mantor, Orlando, FL (US)

(73) Assignee: Advanced Micro Devices, Inc., Santa Clara, CA (US)

(*) Notice: Subject to any disclaimer, the term of this patent is extended or adjusted under 35 U.S.C. 154(b) by 70 days.

(21) Appl. No.: 17/121,354

(22) Filed: Dec. 14, 2020

(65) Prior Publication Data

US 2022/0188076 A1  Jun. 16, 2022

(51) Int. Cl.
   G06F 7/57        (2006.01)
   G06F 17/16       (2006.01)
   G06T 1/20        (2006.01)
   G06F 9/38        (2018.01)
   G06F 15/80       (2006.01)

(52) U.S. Cl.
   CPC .............. *G06F 7/57* (2013.01); *G06F 9/3867* (2013.01); *G06F 17/16* (2013.01); *G06T 1/20* (2013.01); *G06F 15/8015* (2013.01)

(58) Field of Classification Search
   None
   See application file for complete search history.

(56) References Cited

U.S. PATENT DOCUMENTS

| | | | |
|---|---|---|---|
| 10,699,366 | B1 | 6/2020 | Kenney |
| 2009/0150713 | A1 | 6/2009 | Mangione-Smith |
| 2015/0074378 | A1 | 3/2015 | Ge et al. |
| 2017/0371720 | A1* | 12/2017 | Basu ...................... G06F 9/4881 |
| 2018/0121386 | A1* | 5/2018 | Chen ...................... G06F 9/3891 |
| 2018/0239606 | A1* | 8/2018 | Mantor .................. G06F 9/3887 |
| 2019/0034093 | A1* | 1/2019 | Jin ....................... G06F 13/1631 |

FOREIGN PATENT DOCUMENTS

WO     2020172988 A1     9/2020

OTHER PUBLICATIONS

Ubal, R et al., Multi2Sim: A Simulation Framework for CPU-GPU Computing, 2012, ACM, pp. 335-344. (Year: 2012).*
Rhu, M. et al., The Dual-Path Execution Model for Efficient GPU control flow, 2013, IEEE, 12 pages. (Year: 2013).*
International Search Report and Written Opinion dated Apr. 1, 2022 for PCT/US2021/063132, 9 pages.
Wyse, Mark, "Understanding GPGPU Vector Register File Usage", AMD Research, Paul G. Allen School of Computer Science & Engineering, University of Washington, 2018, 11 pages.

* cited by examiner

*Primary Examiner* — Eric Coleman

(57) ABSTRACT

A processing system executes wavefronts at multiple arithmetic logic unit (ALU) pipelines of a single instruction multiple data (SIMD) unit in a single execution cycle. The ALU pipelines each include a number of ALUs that execute instructions on wavefront operands that are collected from vector general process register (VGPR) banks at a cache and output results of the instructions executed on the wavefronts at a buffer. By storing wavefronts supplied by the VGPR banks at the cache, a greater number of wavefronts can be made available to the SIMD unit without increasing the VGPR bandwidth, enabling multiple ALU pipelines to execute instructions during a single execution cycle.

20 Claims, 6 Drawing Sheets

DUAL VECTOR ARITHMETIC LOGIC UNIT

BACKGROUND

A graphics processing unit (GPU) is a complex integrated circuit that is configured to perform graphics-processing tasks. For example, a GPU executes graphics-processing tasks required by a end-user application, such as a video-game application. GPUs are also increasingly being used to perform other tasks which are unrelated to graphics. In many applications, such as graphics processing in a GPU, a sequence of work items, also referred to as threads, are processed to output a final result. In many modern parallel processors, for example, execution units within a single instruction multiple data (SIMD) unit synchronously execute a set of work items. A collection of work items that are spawned by a common process are referred to as a wavefront or warp.

During processing, one or more SIMD units concurrently execute multiple wavefronts. Execution units of the SIMD units, such as one or more arithmetic logic unit (ALU) pipelines including a plurality of ALUs, execute the wavefronts to perform the graphics and vector processing operations. Execution of a wavefront terminates when all work items within the wavefront complete processing. Each wavefront includes multiple work items that are processed in parallel, using the same set of instructions. In some cases, a wavefront is executed at a subset of the ALU pipelines of the SIMD units while the remainder of the ALU pipelines of the SIMD units are idle. If the number of work items in a wavefront exceeds the number of ALUs in an ALU pipeline, execution of the wavefront extends over more than one execution cycle.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for executing wavefronts at multiple arithmetic logic unit (ALU) pipelines of a single instruction multiple data (SIMD) unit in a single execution cycle. The ALU pipelines each include a number of ALUs (also referred to as "lanes") that execute instructions on wavefronts (operands) that are collected from vector general purpose register (VGPR) banks at a cache. The ALUs output results of the instructions executed on the wavefronts at a buffer. By storing wavefronts supplied by the VGPR banks at the cache, a greater number of wavefronts can be made available to the SIMD unit without increasing the VGPR bandwidth, enabling multiple ALU pipelines to execute instructions during a single execution cycle. A controller transfers results that are operands for subsequent instructions to the cache.

In some embodiments, wavefronts include either N work items or 2N work items and each ALU pipeline includes N ALUs. In some embodiments wavefronts include either 32 work items (referred to herein as "wave32") or 64 work items (referred to herein as "wave64"), and each ALU pipeline includes 32 ALUs. The instructions executing at each ALU pipeline require a maximum of three operands per execution cycle; therefore, in some embodiments the cache is sized to store at least six operands to enable two ALU pipelines to execute either a single wave64 instruction or two wave32 instructions in a single execution cycle. In some embodiments, work items of wavefronts are swizzled among VGPR banks to reduce bandwidth for accessing the work items at the ALU pipelines. The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like).

Figure 1:
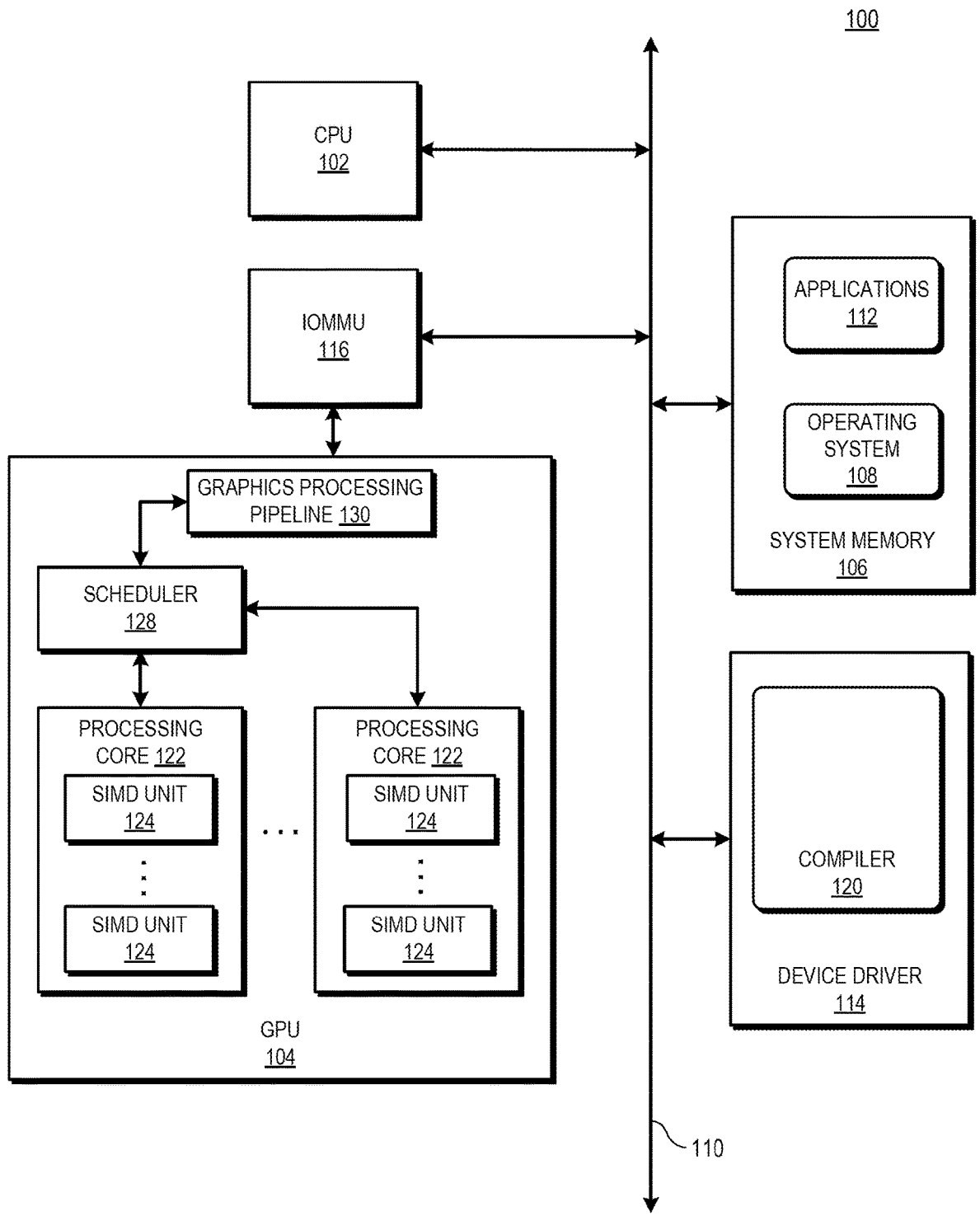
FIG. 1 is a block diagram of a processing system in accordance with some embodiments.

FIG. 1 is a block diagram of a processing system 100 in accordance with some embodiments. The processing system 100 includes a central processing unit (CPU) 102 and a graphics processing unit (GPU) 104. In various embodiments, the CPU 102 includes one or more single- or multi-core CPUs. In various embodiments, the GPU 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. In the embodiment of FIG. 1, the processing system 100 is formed on a single silicon die or package that combines the CPU 102 and the GPU 104 to provide a unified programming and execution environment. This environment enables the GPU 104 to be used as fluidly as the CPU 102 for some programming tasks. In other embodiments, the CPU 102 and the GPU 104 are formed separately and mounted on the same or different substrates. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

As illustrated in FIG. 1, the processing system 100 also includes a system memory 106, an operating system 108, a communications infrastructure 110, and one or more applications 112. Access to system memory 106 is managed by a memory controller (not shown), which is coupled to system memory 106. For example, requests from the CPU 102 or other devices for reading from or for writing to system memory 106 are managed by the memory controller. In some embodiments, the one or more applications 112 include various programs or commands to perform computations that are also executed at the CPU 102. The CPU 102 sends selected commands for processing at the GPU 104. The operating system 108 and the communications infrastructure 110 are discussed in greater detail below. The processing system 100 further includes a device driver 114 and a memory management unit, such as an input/output memory management unit (IOMMU) 116. Components of processing system 100 are implemented as hardware, firmware, software, or any combination thereof. In some embodiments the processing system 100 includes one or more software, hardware, and firmware components in addition to or different from those shown in FIG. 1.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, in various embodiments, parts of control logic to perform one or more operations on CPU 102 reside within system memory 106 during execution of the respective portions of the operation by CPU 102. During execution, respective applications, operating system functions, processing logic commands, and system software reside in system memory 106. Control logic commands that are fundamental to operating system 108 generally reside in system memory 106 during execution. In some embodiments, other software commands (e.g., a set of instructions or commands used to implement a device driver 114) also reside in system memory 106 during execution of processing system 100.

The IOMMU 116 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 116 includes logic to perform virtual to physical address translation for memory page access for devices, such as the GPU 104. In some embodiments, the IOMMU 116 also includes, or has access to, a translation lookaside buffer (TLB) (not shown). The TLB is implemented in a content addressable memory (CAM) to accelerate translation of logical (i.e., virtual) memory addresses to physical memory addresses for requests made by the GPU 104 for data in system memory 106.

In various embodiments, the communications infrastructure 110 interconnects the components of processing system 100. Communications infrastructure 110 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 110 also includes an Ethernet network or any other suitable physical communications infrastructure that satisfies an application's data transfer rate requirements. Communications infrastructure 110 also includes the functionality to interconnect components, including components of processing system 100.

A driver, such as device driver 114, communicates with a device (e.g., GPU 104) through an interconnect or the communications infrastructure 110. When a calling program invokes a routine in the device driver 114, the device driver 114 issues commands to the device. Once the device sends data back to the driver device 114, the device driver 114 invokes routines in an original calling program. In general, device drivers are hardware-dependent and operating-system-specific to provide interrupt handling required for any necessary asynchronous time-dependent hardware interface. In some embodiments, a compiler 120 is embedded within device driver 114. The compiler 120 compiles source code into program instructions as needed for execution by the processing system 100. During such compilation, the compiler 120 applies transforms to program instructions at various phases of compilation. In other embodiments, the compiler 120 is a stand-alone application. In various embodiments, the device driver 114 controls operation of the GPU 104 by, for example, providing an application programming interface (API) to software (e.g., applications 112) executing at the CPU 102 to access various functionality of the GPU 104.

The CPU 102 includes (not shown) one or more of a control processor, field programmable gate array (FPGA), application specific integrated circuit (ASIC), or digital signal processor (DSP). The CPU 102 executes at least a portion of the control logic that controls the operation of the processing system 100. For example, in various embodiments, the CPU 102 executes the operating system 108, the one or more applications 112, and the device driver 114. In some embodiments, the CPU 102 initiates and controls the execution of the one or more applications 112 by distributing the processing associated with one or more applications 112 across the CPU 102 and other processing resources, such as the GPU 104.

The GPU 104 executes commands and programs for selected functions, such as graphics operations and other operations that are particularly suited for parallel processing. In general, GPU 104 is frequently used for executing graphics pipeline operations, such as pixel operations, geometric computations, and rendering an image to a display. In some embodiments, GPU 104 also executes compute processing operations (e.g., those operations unrelated to graphics such as video operations, physics simulations, computational fluid dynamics, etc.), based on commands or instructions received from the CPU 102. For example, such commands include special instructions that are not typically defined in the instruction set architecture (ISA) of the GPU 104. In some embodiments, the GPU 104 receives an image geometry representing a graphics image, along with one or more commands or instructions for rendering and displaying the image. In various embodiments, the image geometry corresponds to a representation of a two-dimensional (2D) or three-dimensional (3D) computerized graphics image.

In various embodiments, the GPU 104 includes one or more compute units, such as one or more processing cores 122 that include one or more SIMD units 124 that are each configured to execute a thread concurrently with execution of other threads in a wavefront by other SIMD units 124, e.g., according to a SIMD execution model. The SIMD execution model is one in which multiple processing elements share a single program control flow unit and program counter and thus execute the same program but are able to execute that program with different data. The processing cores 122 are also referred to as shader cores or streaming multi-processors (SMXs). The number of processing cores 122 that are implemented in the GPU 104 is a matter of design choice. Each processing core 122 includes one or more processing elements such as scalar and/or vector floating-point units, arithmetic and logic units (ALUs), and the like. In various embodiments, the processing cores 122 also include special purpose processing units (not shown), such as inverse-square root units and sine/cosine units.

Each of the one or more processing cores 122 executes a respective instantiation of a particular work item to process incoming data, where the basic unit of execution in the one or more processing cores 122 is a work item (e.g., a thread). Each work item represents a single instantiation of, for example, a collection of parallel executions of a kernel invoked on a device by a command that is to be executed in parallel. A work item executes at one or more processing elements as part of a workgroup executing at a processing core 122.

The GPU 104 issues and executes work-items including groups of threads executed simultaneously as a "wavefront" on a single SIMD unit 124. Wavefronts may also be interchangeably referred to as warps, vectors, or threads. In some embodiments, wavefronts include instances of parallel execution of a shader program, where each wavefront includes multiple work items that execute simultaneously on a single SIMD unit 124 in line with the SIMD paradigm (e.g., one instruction control unit executing the same stream of instructions with multiple data). A scheduler 128 is configured to perform operations related to scheduling various wavefronts on different processing cores 122 and SIMD units 124, as well as performing other operations for orchestrating various tasks on the GPU 104.

To reduce latency associated with off-chip memory access, various GPU architectures include a memory cache hierarchy (not shown) including, for example, L1 cache and a local data share (LDS). The LDS is a high-speed, low-latency memory private to each processing core 122. In some embodiments, the LDS is a full gather/scatter model so that a work-group writes anywhere in an allocated space.

The parallelism afforded by the one or more processing cores 122 is suitable for graphics related operations such as pixel value calculations, vertex transformations, tessellation, geometry shading operations, and other graphics operations. A graphics processing pipeline 130 accepts graphics processing commands from the CPU 102 and thus provides computation tasks to the one or more processing cores 122 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units 124 in the one or more processing cores 122 in order to process such data elements in parallel. As referred to herein, for example, a compute kernel is a function containing instructions declared in a program and executed on an APD processing core 122. This function is also referred to as a kernel, a shader, a shader program, or a program.

To facilitate the processing of either a single wave64 wavefront instruction, or two wave32 wavefront instructions, across two 32-lane ALU pipelines of a SIMD unit 124 in a single execution cycle, the processing cores 122 include a cache to expand the number of operands (wavefronts) received from vector general purpose register (VGPR) banks and that are available as inputs to each of the SIMD units 124, as described in more detail with respect to FIG. 2 below. Results of the instructions executed by the ALU pipelines on the wavefronts are output to a buffer (not shown). A controller (not shown) transfers results that are operands for subsequent instructions to the cache.

In various embodiments, processing system 100 can be a computer, laptop, mobile device, server or any of various other types of computing systems or devices. It is noted that the number of components of processing system 100 can vary from embodiment to embodiment. There can be more or fewer of each component/subcomponent than the number shown in FIG. 1. It is also noted that processing system 100 can include other components not shown in FIG. 1. Additionally, in other embodiments, processing system 100 can be structured in other ways than shown in FIG. 1.

Figure 2:
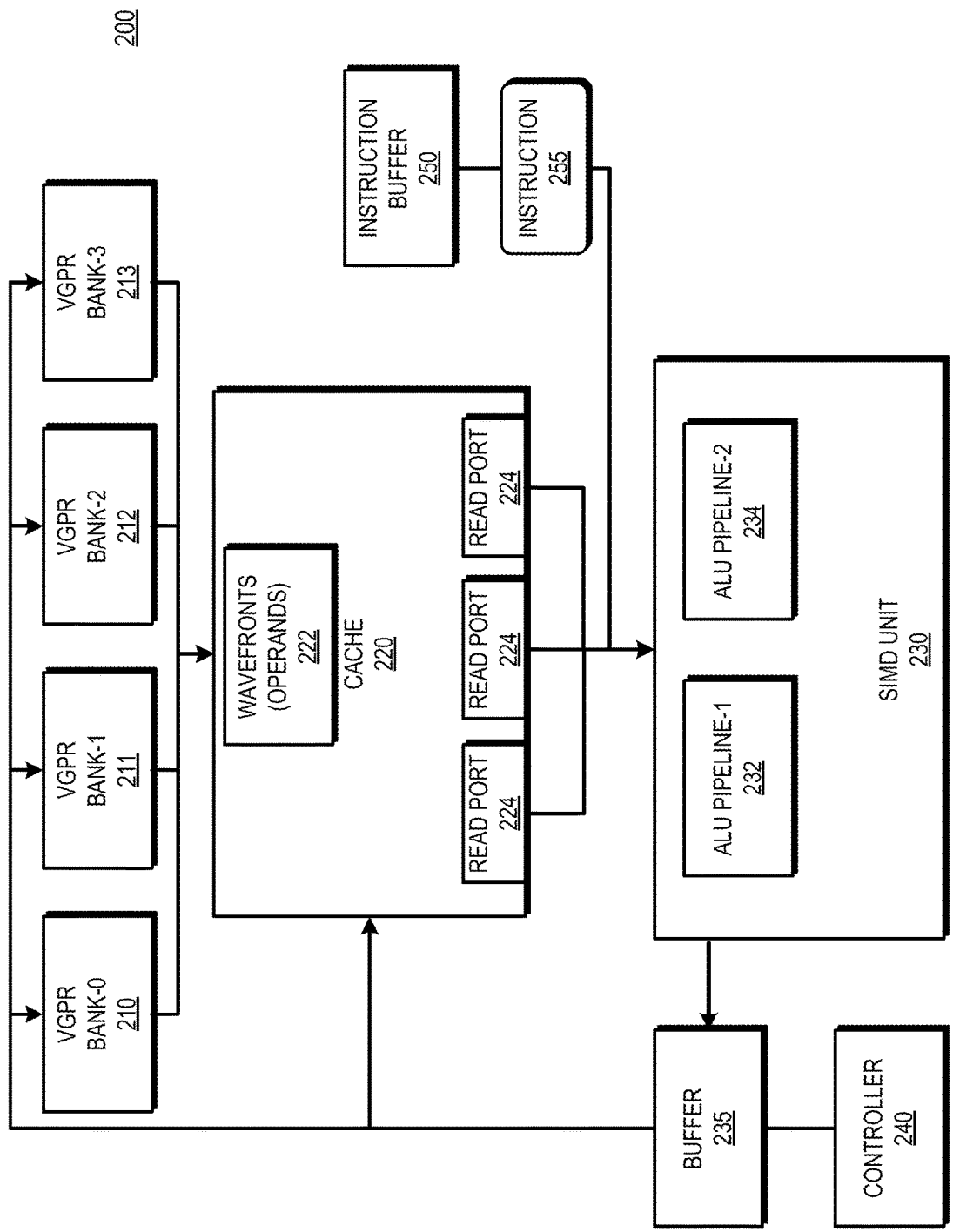
FIG. 2 is a block diagram of a portion of a processing system employing dual arithmetic logic unit (ALU) pipeline processing in accordance with some embodiments.

FIG. 2 is a block diagram of a portion 200 of the GPU 104 of the processing system 100 employing dual arithmetic logic unit (ALU) pipeline processing in accordance with some embodiments. The portion 200 of the GPU 104 includes a SIMD unit 230 including two ALU pipelines, ALU pipeline-1 232 and ALU pipeline-2 234, and a cache 220. The cache 220 receives wavefronts (operands) 222 from a set of VGPR banks 210, 211, 212, 213. The SIMD unit 230 receives a wavefront instruction (also referred to simply as an instruction) 255 from an instruction buffer 250 to perform operations on the wavefronts 222 stored at the cache 220. The results of the executed instruction 255 are stored at a buffer 235, and a controller 240 transfers results that are operands for subsequent instructions to the cache 220 and to the VGPR banks 210, 211, 212, 213.

Each of ALU pipeline-1 232 and ALU pipeline-2 234 include N ALUs. In some embodiments, each of ALU pipeline-1 232 and ALU pipeline-2 234 support the same types of wavefront instructions, and in other embodiments, ALU pipeline-2 234 supports a subset of the types of wavefront instructions supported by ALU pipeline-1 232. For example, in some embodiments, ALU pipeline-1 232 and ALU pipeline-2 234 support fused multiply add (FMA) wavefront instructions to compute the product of a and b and then add c to the product.

A set of VGPR banks, VGPR bank-0 210, VGPR bank-1 211, VGPR bank-2 212, and VGPR bank-3 213 (collectively, VGPR banks 210-213) receives inputs from sources (not shown) such as local data share return data, texture return data, and VGPR initialization inputs, and provides wavefronts to the cache 220. In some embodiments, the cache 220 is sized to store at least six wavefronts and includes at least three read ports 224 to provide input operands 222 to ALU pipeline-1 232 and ALU pipeline-2 234. In some embodiments, each VGPR bank 210-213 can be accessed independently from the other VGPR banks 210-213. Each VGPR bank 210-213 includes N registers, wherein the value of N varies from embodiment to embodiment. The size of the registers in VGPR banks 210-213 also varies according to the embodiment.

Vector ALU (VALU) instructions, such as instruction 255, are stored at the instruction buffer 250 and are conveyed to ALU pipeline-1 232 and ALU pipeline-2 234 from a gather instruction queue (not shown). ALU pipeline-1 232 and ALU pipeline-2 234 receive the instruction 255 and wavefront operands 222 from the cache 220 via read ports 224 and perform the commands indicated by the instruction 255 on the wavefront operands 222 in a single execution cycle. ALU pipeline-1 232 and ALU pipeline-2 234 output the results from the instruction 255 to buffer 235. Controller 240 determines which of the results stored at the buffer 235 are source operands for a subsequent instruction and transfers the source operands to the cache 220. Controller 240 is implemented as hardware, firmware, software, or any combination thereof.

Figure 3:
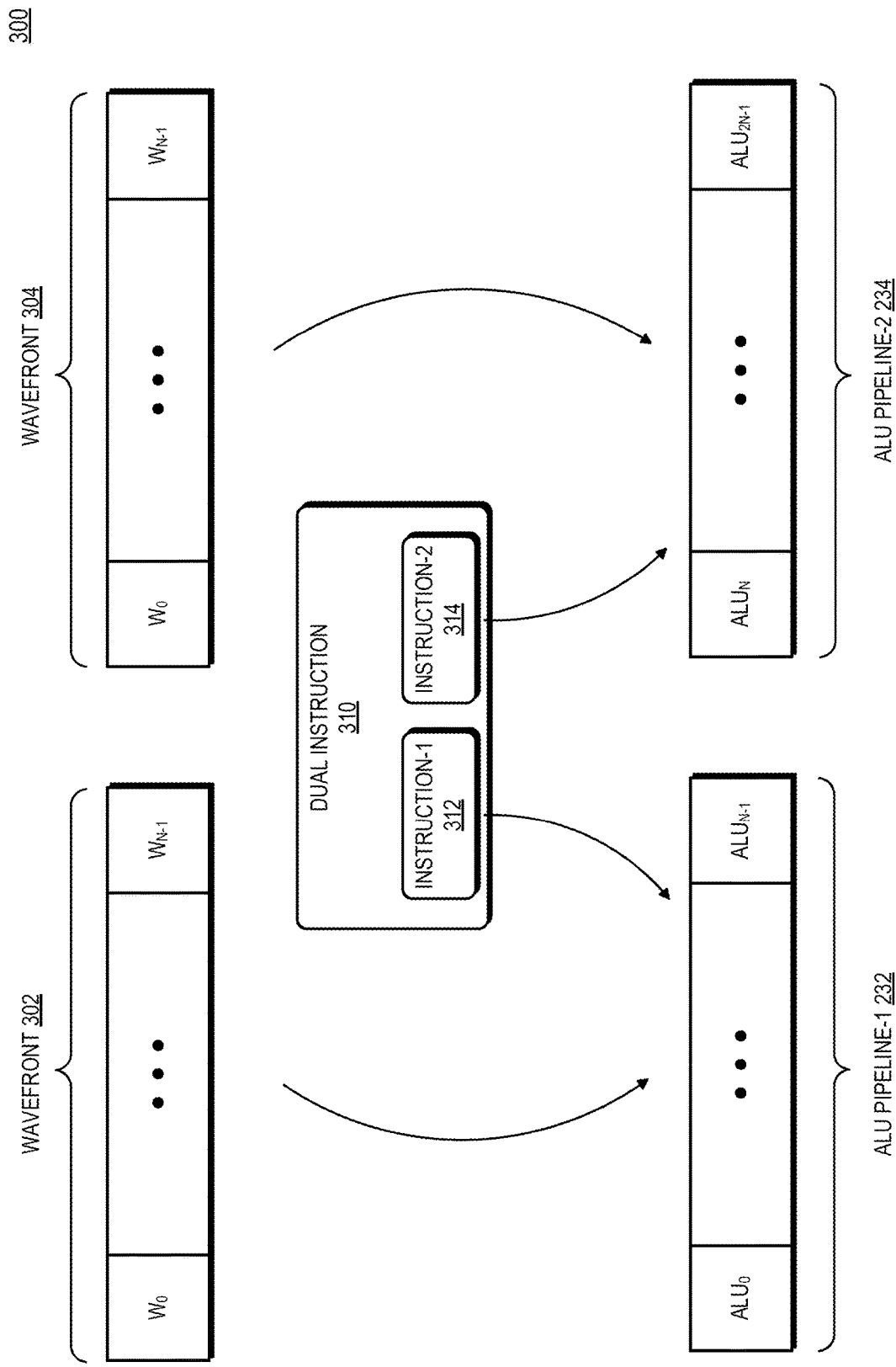
FIG. 3 illustrates a dual instruction for executing two single instruction multiple data (SIMD) ALU instructions at two ALU pipelines of a SIMD unit in a single cycle in accordance with some embodiments.

FIG. 3 illustrates one embodiment 300 of an example dual instruction 310 for executing two instructions on one or more wavefronts such as wavefronts 302, 304 at two ALU pipelines of a single instruction multiple data (SIMD) unit in a single cycle in accordance with some embodiments. In the illustrated example, each of wavefront 302 and wavefront 304 have N number of work items, with N being a positive integer, and with N varying from embodiment to embodiment. Similarly, each of ALU pipeline-1 232 and ALU pipeline-2 234 include N lanes (ALUs). In one embodiment, N is equal to 32.

Dual instruction 310 describes a pair of instructions—instruction-1 312 and instruction-2 314—that are independent of each other and issued from one wave in a single cycle. Dual instruction 310 includes an indication that the wavefronts 302, 304 have the same number of work items as the number of ALUs in each of the ALU pipelines 232, 234. Instruction-1 312 issues to ALU pipeline-1 232 and instruction-2 314 issues to ALU pipeline-2 234. In some embodiments, each of instruction-1 312 and instruction-2 314 uses up to two VGPR banks, and in some embodiments, the source operands for each of instruction-1 312 and instruction-2 314 use different VGPR banks.

Figure 4:
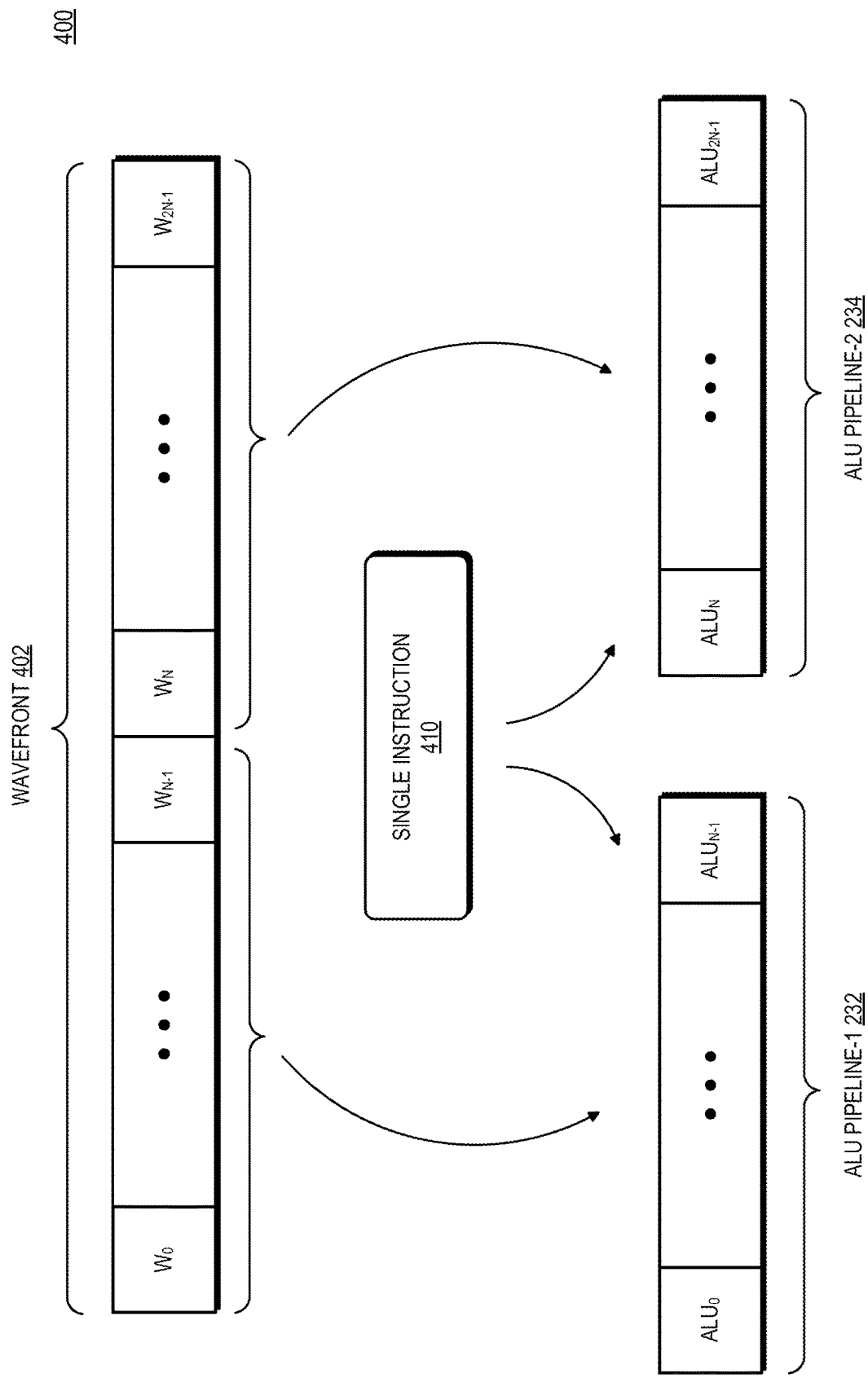
FIG. 4 illustrates a single instruction for executing a wavefront at two ALU pipelines of a SIMD unit in a single cycle in accordance with some embodiments.

FIG. 4 illustrates one embodiment 400 of an example single instruction 410 for executing a wavefront 402 at two ALU pipelines of a SIMD unit in a single cycle in accordance with some embodiments. In the illustrated example, wavefront 402 has 2*N number of work items, with N being a positive integer, and with N varying from embodiment to embodiment. In one embodiment, N is equal to 32. The first portion of wavefront 402 includes work items $W_0$ through $W_{N-1}$, and the second portion of wavefront 402 includes work items $W_N$ through $W_{2N-1}$. The single instruction 410 includes an indication that the wavefront 402 has the same number of work items as the number of ALUs in both of the ALU pipelines 232, 234 added together. The single instruction 410 further indicates that a single portion of wavefront 402, such as the portion including work items $W_0$ through $W_{N-1}$, is intended to execute on lanes $ALU_0$ through $ALU_{N-1}$ of ALU pipeline-1 232 in a given instruction cycle while the other portion of wavefront 402, such as the portion including work items $W_N$ through $W_{2N-1}$, is intended to execute on lanes $ALU_N$ through $ALU_{2N-1}$ of ALU pipeline-2 234 in the same instruction cycle.

In one embodiment, N is 32, and the number of work items per wavefront is 64. In other embodiments, N can be other values. In the embodiment when N is 32, ALU pipeline-1 232 and ALU pipeline-2 234 also each include 32 lanes (or ALUs) which are shown as lanes $ALU_0$ through $ALU_{N-1}$ and $ALU_N$ through $ALU_{2N-1}$.

Figure 5:
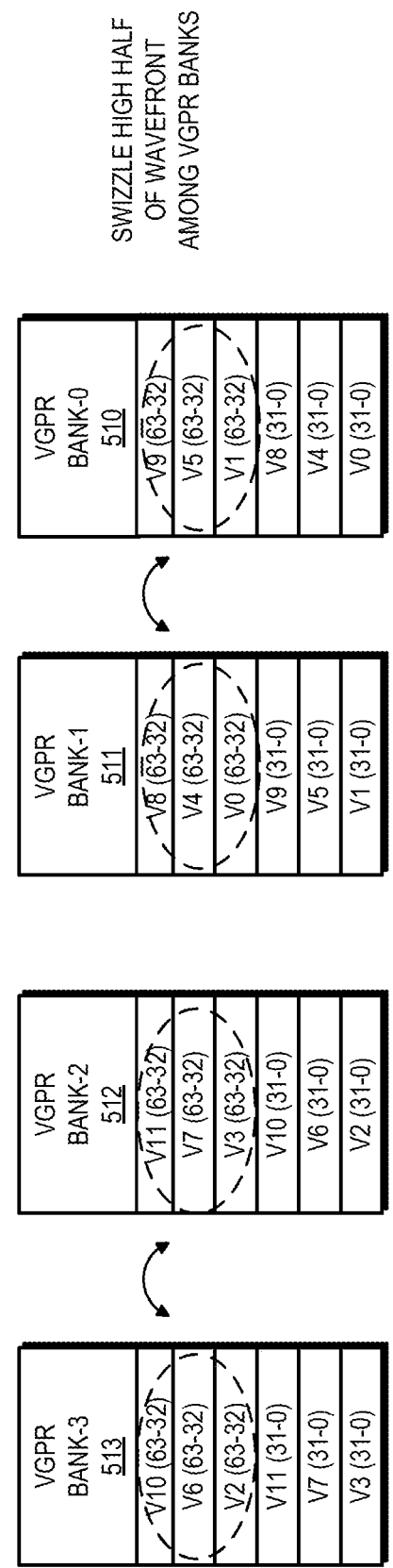
FIG. 5 illustrates swizzling work items of a wavefront among vector general purpose register banks in accordance with some embodiments.

FIG. 5 illustrates one embodiment 500 of an example of swizzling work items of a wavefront among vector general purpose register banks VGPR bank-0 510, VGPR bank-1 511, VGPR bank-2 512, VGPR bank-3 513 (collectively, VGPR banks 510-513) in accordance with some embodiments. To facilitate execution of a wavefront including 2*N work items at two ALU pipelines, each including N lanes (or ALUs), in a single instruction cycle, the upper and lower halves of a VGPR are located in different banks. In the illustrated example, N is 32, and the number of work items in the wavefront is 64. The lower half of the wavefront (corresponding to lanes 31-0) is arranged such that bank[1:0]=VGPR[1:0], while the upper half of the wavefront (corresponding to lanes 63-32) is swizzled (i.e., swapped) such that bank[1:0]={VGPR[1], ~VGPR[0]}.

Thus, for example, V0(31-0) is located in VGPR bank-0 510, while V0(63-32) is located in VGPR bank-1 511, and V1(31-0) is located in VGPR bank-1 511, while V1(63-32) is located in VGPR bank-0 510. Similarly, V2(31-0) is located in VGPR bank-2 512, while V2(63-32) is located in VGPR bank-3 513, and V3(31-0) is located in VGPR bank-3 513, while V3(63-32) is located in VGPR bank-2 512. In this way, the work items of the wavefront are distributed equally among the VGPR banks 510-513. Distributing the work items of the wavefront among the VGPR banks by swizzling enables the source to be read in one cycle for 64 lanes.

Figure 6:
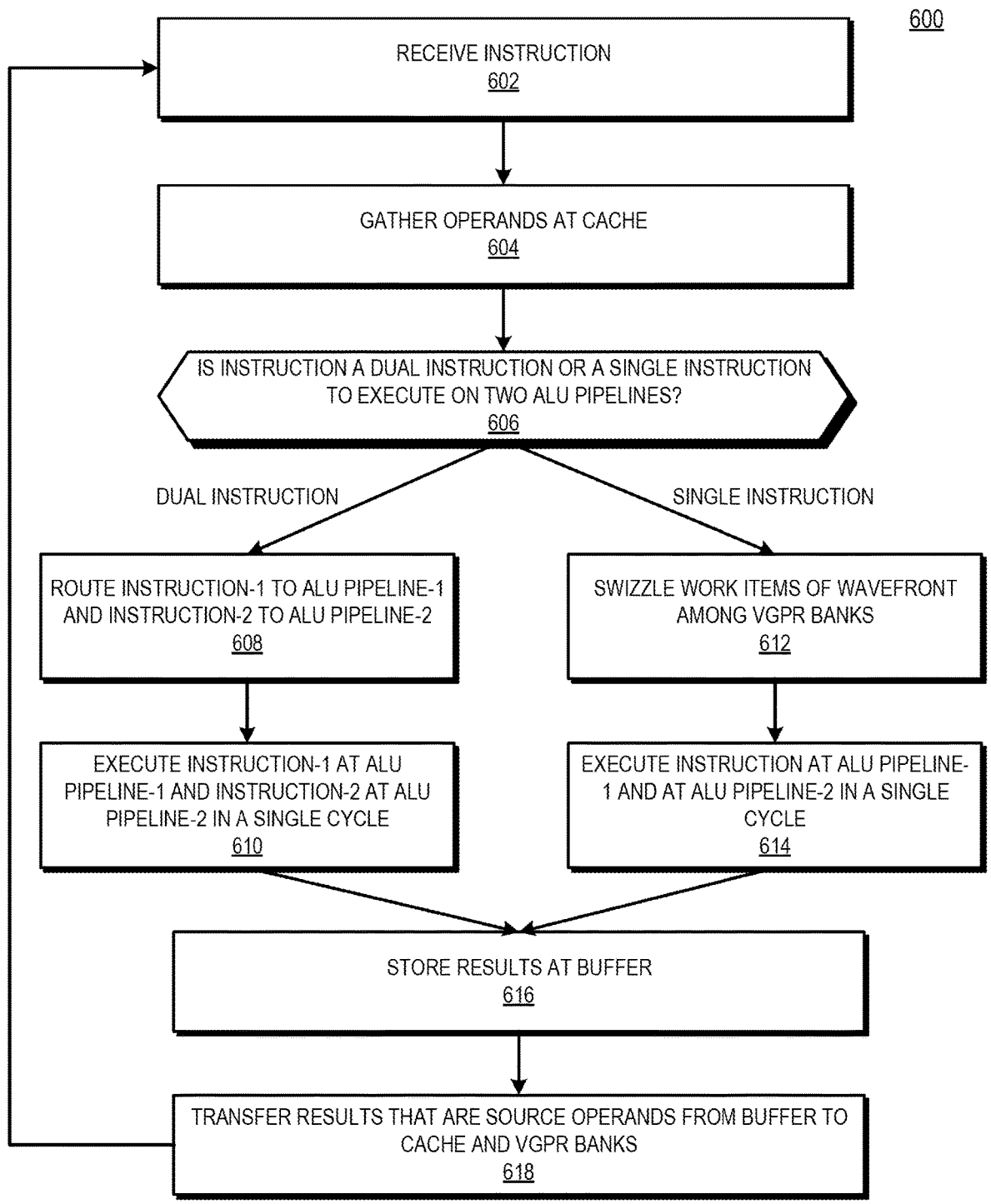
FIG. 6 is a flow diagram illustrating a method for executing one or more instructions at two ALU pipelines of a SIMD unit in a single cycle in accordance with some embodiments.

FIG. 6 is a flow diagram illustrating a method 600 for executing one or more instructions at two ALU pipelines of a SIMD unit in a single cycle in accordance with some embodiments. The method 600 is described with respect to an example implementation at the processing system 100 of FIGS. 1 and 2. At block 602, the SIMD unit 124 receives an instruction 255 from the instruction buffer 250. At block 604, the SIMD unit 124 gathers operands at the cache 220. At block 606, the SIMD unit 124 determines if the instruction 255 is a dual instruction or a single instruction to execute on two ALU pipelines.

If, at block 606, the SIMD unit 124 determines that the instruction is a dual instruction 310, including instruction-1 312 and instruction-2 314, the method flow continues to block 608. At block 608, the SIMD unit 124 routes instruction-1 312 to ALU pipeline-1 232 and routes instruction-2 314 to ALU pipeline-2 234. At block 610, ALU instruction pipeline-1 232 executes instruction-1 and instruction pipeline-2 234 executes instruction-2 using source operands stored at the cache 220 in a single instruction cycle. The method flow then continues to block 616.

If, at block 606, the SIMD unit 124 determines that the instruction is a single instruction 410 to execute on both ALU pipeline-1 232 and ALU pipeline-2 234, the method flow continues to block 612. At block 612, the GPU 104 swizzles work items of the source operands among VGPR banks to evenly distribute the wavefronts such that they can be read into the cache 220 in a single instruction cycle. At block 614, ALU pipeline-1 232 and ALU pipeline-2 234 both execute the instruction 410 using the source operands stored at the cache 220 in a single instruction cycle. The method flow then continues to block 616.

At block 616, the SIMD unit 124 stores the results of the instruction at the buffer 235. At block 618, the controller 240 transfers results that are source operands for subsequent instructions from the buffer 235 to the cache 220 and to the VGPR banks 210, 211, 212, 213. The method flow then continues back to block 602 for the next instruction.

In some embodiments, the apparatus and techniques described above are implemented in a system including one or more integrated circuit (IC) devices (also referred to as integrated circuit packages or microchips), such as the processing system described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
transferring, from a set of vector general purpose register (VGPR) banks to a cache, a set of wavefronts, each wavefront comprising a number of work items, for execution at an execution unit comprising a first arithmetic logic unit (ALU) pipeline and a second ALU pipeline; and
selectively executing either a single instruction or a dual instruction on the set of wavefronts in a first execution cycle both at the first ALU pipeline and at the second ALU pipeline.

2. The method of claim 1, wherein
the number of work items of a wavefront equals a number of ALUs of the first ALU pipeline plus a number of ALUs of the second ALU pipeline; and
selectively executing comprises executing a single instruction both at the first ALU pipeline and at the second ALU pipeline in the first execution cycle.

3. The method of claim 2, further comprising:
distributing the work items of a wavefront of the set of wavefronts evenly among the set of VGPR banks.

4. The method of claim 1, further comprising:
storing results of the single instruction or the dual instruction at a buffer.

5. The method of claim 4, further comprising:
transferring the results of the single instruction or the dual instruction from the buffer to the cache in response to an instruction depending on the results.

6. The method of claim 1, wherein
the number of work items of a wavefront equals a number of ALUs of the first ALU pipeline; and
selectively executing comprises executing a dual instruction comprising a first instruction to execute on a first wavefront at the first ALU pipeline and a second instruction to execute on a second wavefront at the second ALU pipeline in the first execution cycle.

7. A method, comprising:
transferring a set of wavefronts from a set of vector general purpose register (VGPR) banks to a cache; and
selectively executing either a single instruction or a dual instruction, both at a first arithmetic logic unit (ALU) pipeline comprising a first plurality of ALUs and at a second ALU pipeline comprising a second plurality of ALUs, in a first execution cycle based on the set of wavefronts, wherein a first wavefront of the set of wavefronts comprises a number of work items.

8. The method of claim 7, further comprising:
storing at the cache read values from the set of VGPR banks.

9. The method of claim 7, further comprising:
storing results of the single instruction or the dual instruction at a buffer.

10. The method of claim 9, further comprising:
transferring the results from the buffer to the cache in response to an instruction depending on the results.

11. The method of claim 7, wherein the dual instruction comprises a first instruction to execute on a second wavefront at the first ALU pipeline and a second instruction to execute on a third wavefront at the second ALU pipeline in the first execution cycle.

12. The method of claim 11, wherein
the number of work items of the second wavefront of the set of wavefronts equals a number of ALUs of the first ALU pipeline and the number of work items of the third wavefront equals a number of ALUs of the second ALU pipeline.

13. A device, comprising:
a cache to store a first set of wavefronts transferred from a set of vector general purpose register (VGPR) banks, each wavefront comprising a number of work items; and
an execution unit comprising a first arithmetic logic unit (ALU) pipeline and a second ALU pipeline to selectively execute either a single instruction or a dual instruction on the first set of wavefronts in a first execution cycle both at the first ALU pipeline and at the second ALU pipeline, wherein the first ALU pipeline and the second ALU pipeline each comprise a respective plurality of ALUs.

14. The device of claim 13, further comprising:
the set of VGPR banks to transfer wavefronts to the cache.

15. The device of claim 13, further comprising:
a buffer to store results from the single instruction or the dual instruction.

16. The device of claim 15, further comprising:
a controller to transfer results from the buffer to the cache in response to an instruction depending on the results.

17. The device of claim 13, wherein the dual instruction comprises a first instruction to execute on a first wavefront at the first ALU pipeline and a second instruction to execute on a second wavefront at the second ALU pipeline in the first execution cycle.

18. The device of claim 13, wherein
the number of work items of a first wavefront equals a number of ALUs of the first ALU pipeline plus a number of ALUs of the second ALU pipeline; and
the execution unit is to selectively execute a single instruction in the first execution cycle both at the first ALU pipeline and at the second ALU pipeline.

19. The method of claim 7, wherein
the number of work items of the first wavefront equals a number of ALUs in the first ALU pipeline plus a number of ALUs in the second ALU pipeline.

20. The method of claim 19, wherein
the first wavefront includes an indication that the number of work items of the first wavefront equals the number of ALUs in the first ALU pipeline plus the number of ALUs in the second ALU pipeline.

* * * * *